United States Patent
Schreckenberg et al.

(10) Patent No.: US 10,922,861 B2
(45) Date of Patent: Feb. 16, 2021

(54) METHOD AND APPARATUS FOR CORRECTING DYNAMIC MODELS OBTAINED BY TRACKING METHODS

(71) Applicant: TOMTEC IMAGING SYSTEMS GMBH, Unterschleissheim (DE)

(72) Inventors: Marcus Schreckenberg, Freising (DE); Alexander Rossmanith, Germering (DE); Daniel Stapf, UnterschleiBheim (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/335,757

(22) PCT Filed: Sep. 21, 2017

(86) PCT No.: PCT/EP2017/073880
§ 371 (c)(1),
(2) Date: Mar. 22, 2019

(87) PCT Pub. No.: WO2018/055026
PCT Pub. Date: Mar. 29, 2018

(65) Prior Publication Data
US 2019/0251724 A1 Aug. 15, 2019

(30) Foreign Application Priority Data
Sep. 22, 2016 (DE) .......................... 102016117889.6

(51) Int. Cl.
*G06T 11/20* (2006.01)
*G06T 7/00* (2017.01)
(Continued)

(52) U.S. Cl.
CPC .............. *G06T 11/206* (2013.01); *G06T 3/20* (2013.01); *G06T 3/40* (2013.01); *G06T 3/60* (2013.01);
(Continued)

(58) Field of Classification Search
CPC ..... G06T 11/60; G06T 19/20; G06T 2200/24; G06T 2207/10016; G06T 2207/10132;
(Continued)

(56) References Cited

U.S. PATENT DOCUMENTS

2005/0074153 A1* 4/2005 Pedrizzetti .......... G01S 7/52036
382/128
2005/0203395 A1* 9/2005 Sui ........................ G06T 7/0016
600/437
(Continued)

FOREIGN PATENT DOCUMENTS

JP           5842039 B1 *   1/2016   ........... A61B 8/0883

OTHER PUBLICATIONS

Meyers, J. Hurley et al, "Direct measurement of inner and outer wall thickening dynamics with epicardial echocardiography", Laboratory Investigation, Echocardiography, vol. 74, No. 1, Jul. 1986, https://www.ahajournals.org/doi/pdf/10.1161/01.CIR.74.1.164 (Year: 1986).*

(Continued)

*Primary Examiner* — Michelle L Sams (57) ABSTRACT

The invention relates to a method and an apparatus for correcting dynamic models (4) of moving structures (2), said dynamic models being obtained by tracking methods. The method comprises the following steps: (a) providing a time series of images (B) of the moving structure (2) recorded successively in time; (b) providing a dynamic model (4) of the structure (2), said dynamic model being obtained by a tracking method; (c) determining a position time section (h)

(Continued)

in the images (B); (d) providing a position-time representation (6) over time of the optionally interpolated image values of the position time section (h) in the images, combined with a representation of the dynamic model (4) as at least one computer graphical object (10); (e) comparing the computer graphical object (10) with the surrounding image content (8), in particular by a user, and (f) correcting the dynamic model (4) by editing the at least one computer graphical object (10), in particular by a user.

14 Claims, 9 Drawing Sheets

(51) Int. Cl.
| | | |
|---|---|---|
| *G06T 19/20* | (2011.01) | |
| *G06T 3/20* | (2006.01) | |
| *G06T 3/40* | (2006.01) | |
| *G06T 3/60* | (2006.01) | |
| *G06T 7/20* | (2017.01) | |
| *G06T 11/60* | (2006.01) | |

(52) U.S. Cl.
CPC .............. *G06T 7/0012* (2013.01); *G06T 7/20* (2013.01); *G06T 11/60* (2013.01); *G06T 19/20* (2013.01); *G06T 2200/24* (2013.01); *G06T 2207/10016* (2013.01); *G06T 2207/10132* (2013.01); *G06T 2207/20092* (2013.01); *G06T 2207/30048* (2013.01)

(58) Field of Classification Search
CPC . G06T 2207/20082; G06T 2007/30048; G06T 7/0012; G06T 7/20; G06T 11/602
See application file for complete search history.

(56) References Cited

U.S. PATENT DOCUMENTS

| | | | | |
|---|---|---|---|---|
| 2006/0173292 | A1* | 8/2006 | Baba | .................... A61B 8/469 600/425 |
| 2011/0313291 | A1* | 12/2011 | Chono | ................ A61B 8/0883 600/440 |

OTHER PUBLICATIONS

International Search Report for International Application Serial No. PCT/EP2017/073880, dated Nov. 13, 2017, 4 pages.
Written Opinion of the International Searching Authority for International Application No. PCT/EP2017/073880, dated Nov. 13, 2017, 7 pages.

* cited by examiner

METHOD AND APPARATUS FOR CORRECTING DYNAMIC MODELS OBTAINED BY TRACKING METHODS

This application is the U.S. National Phase application under 35 U.S.C. § 371 of International Application No. PCT/EP2017/073880, filed on Sep. 21, 2017, which claims the benefit of DE Application Serial No. 102016117889.6, filed Sep. 22, 2016. These applications are hereby incorporated by reference herein.

The invention relates to a method, an apparatus and a computer program for correcting dynamic models of moving structures captured in images, said dynamic models being obtained by tracking methods.

In so-called tracking methods, dynamic structures in image sequences are tracked automatically. An example of this is the so-called speckle tracking in the case of ultrasound images: the so-called "speckle" is a characteristic interference pattern of anatomical structures during an ultrasound examination that arises by virtue of the ultrasound wavelength being greater than the size of the reflecting particles or cells. The characteristic grainy look of ultrasound images arises from these interferences. However, this speckle pattern can be used for tracking specific anatomical structures from one image to the next within the scope of an image sequence and for obtaining a dynamic model of a structure as a result thereof. A known example is e.g. the tracking of endocardium contours in a time series of ultrasound images. In other type of images, for example dynamic magnetic resonance imaging (MRI) images, characteristic features of the presented structures can be used instead of the speckle in the tracking method (this is referred to as feature tracking).

The principle of three-dimensional (3D) speckle tracking algorithms in the context of tracking myocardial motion on three-dimensional real-time (RT3D) echocardiography images is described for example in Lorsakul, Auranuch et al. "Parameterization of real-time 3D speckle tracking framework for cardiac strain assessment." Engineering in Medicine and Biology Society, EMBC, 2011 Annual International Conference of the IEEE. IEEE, 2011. An example of an endocardial contour model obtained by speckle tracking can be found in figure 2 of the paper by Auger, Dominique et al. "Three-dimensional imaging in cardiac resynchronization therapy" Revista Española de Cardiologia (English Edition) 2011; 64 (11): 1035-1044.

Digital sculpting, also known as Sculpt Modeling or 3D Sculpting, is the use of software that offers tools to push, pull, smooth, grab, pinch or otherwise manipulate a digital object as if it were made of a real-life substance such as clay.

These days, most tracking methods run automatically; i.e., it is possible to fully automatically create dynamic models of moving structures. However, finding possible errors in the tracking methods is only possible with great difficulties. An overlaid presentation of the dynamic model with the image sequence in order to allow the user to verify the tracking is conceivable: the tracking is correct if the dynamic model and the target structure to be tracked move synchronously. Pronounced errors are recognizable in this manner; however, it is very difficult to correct the errors identified thus since both the target structure to be tracked and the dynamic model move.

It is therefore an object of the present invention to facilitate, in a simple manner, an accurate correction of dynamic models of moving structures that are captured in images, said dynamic models being obtained by tracking methods.

The invention achieves this object by the method according to claim 1, the computer program according to claim 12 and the apparatus according to claim 14.

In the method according to the invention, a time series of images recorded successively in time (which is also referred to as an image sequence) is initially provided, the moving structure being at least partly imaged in said images. The image sequence can be acquired immediately or some time before carrying out the method according to the invention (or as a part thereof), in particular by medical imaging methods such as e.g. 2D, 3D or 4D ultrasound, magnetic resonance imaging (MRI), x-raying, in particular fluoroscopy, computed tomography (CT), SPECT (single photon emission computed tomography), PET (positron emission tomography) or infrared imaging. However, the image sequence can also be an optical video recording of a moving scene which, for example, is recorded by a camera of a moving vehicle. The required time resolution depends on the movement of the moving structure of interest, said moving structure being at least partly imaged in at least a majority of the images recorded in succession.

The images are two-dimensional (2D) or three-dimensional (3D) image data records, i.e. digital image data, in particular two-dimensional or three-dimensional matrices with image values. Thus, the time series of images is often a sequence of 2D or 3D images recorded successively over a certain period of time, e.g. like a movie. The image values can be grayscale values, as is e.g. conventional in B-mode ultrasound, but also color values, as in the case of optical images or videos. A 2D image is thus a 2D matrix of image values, e.g. of greyscale values which may have values between 0 and 255.

The invention is particularly preferably applied in echocardiography, where e.g. approximately 10 to 30 images of the human or animal heart are acquired per second, in particular by transthoracic ultrasound. The images can be a sequence of 2D or 3D images.

In a next step, a dynamic model of the structure obtained by a tracking method is provided (or produced), said dynamic model being registered with the images. Thus, such a dynamic model is produced by virtue of certain markings (e.g.: speckle elements) being recognized and marked on the first image of the time series in particular, either automatically or by a user, and the movement of these marks being tracked from image to image. As a result, it is possible to track certain points/marks/landmarks of the moving structure and determine the position thereof in each image. Then, the tracked points on each image may be connected to a contour or surface, which changes its position or shape from one image in the series to the next, and which may be represented by a dynamic model. The tracking method can be a speckle tracking method—in the case of ultrasound images—and it can be a so-called feature tracking method in other imaging methods or optical images. Preferably the dynamic model is obtained by a tracking method applied on the time series of images provided in step (a), in which case the dynamic model is automatically registered with the time series of images.

Preferably, these position information items are stored as a dynamic model. The model can simply contain coordinate information items; however, it may also contain a certain abstraction of the tracked data. By way of example, it is possible to store certain surface elements of the structure in the form of a grid or wireframe or mesh model, in which only the nodes are stored and the area therebetween is spanned with the aid of triangles or other geometric surfaces. For example, the moving structure may be represented in the model by an interconnected surface mesh of polygons. However, the dynamic model can also be provided as a mathematical function. Preferably, the dynamic model is a slightly simplified approximation of the moving structure.

The dynamic model is preferably a 1 D or 2D model, which e.g. changes its position and/or shape in the three spatial directions over time. For example, in the case of a time series of 2D images, the dynamic model may be a representation of a boundary of an organ, or the boundary between the heart muscle and the blood inside a ventricle or atrium, such as the endocardium. Because the images from which the dynamic model is developed are 2D images, the dynamic model will be a—possibly curved—1D line which changes in shape over time. In the case of a time series of 3D images, preferably the dynamic model will be a 2D model of a curved surface representing e.g. a boundary of an organ, or the boundary between the heart muscle and the blood.

The moving structure can be—in the case of medical images—a moving organ, for example the human or animal heart, but also other moving organs, such as blood vessels, lung, chest, or else moving surgical instruments, e.g. a catheter. However, the invention can also be applied to the analysis of moving structures or objects in video sequences; in this case, the moving structures are e.g. other road users. If the camera with which the image sequence is recorded moves, a "moving structure" may optionally also be a static object which, however, moves relative to the camera.

The dynamic model is registered to the images, i.e. the position of the model in relation to the image coordinates is known for every image in the series. Therefore, it is possible, for example, to overlay the model on one or more images of the series. From a purely theoretical point of view, it would also be possible to correct the model in such an overlaid presentation. However, this was found to be very exhausting since a correction has to take place individually in each image of the image series.

Here, the invention provides a simplified correction option by virtue of a position time section, in particular a one-dimensional position time section, being determined in the images of the time series. Preferably, this is brought about by a user in e.g. the first image of the time series; however, this can also be effectuated automatically. The position time section can have the same image coordinates in all images of the time series (i.e., the same position time section is used, as it were, for all images); however, the position can also be different for different images, as will still be explained in more detail below. In particular, the position time section is one-dimensional, e.g. a straight line or a curved line, preferably a straight line, which, for example, can be plotted in one of the images by a user and which preferably intersects the moving structure of interest. In the following, the position time section is therefore sometimes referred to as position time line or vector h.

After the position time section is set in each of the images, a position-time representation is generated on the basis of the section, i.e. the image values of the position time section are determined, for example by interpolation of the pixel values of the images. This may be required since the position time section may assume any orientation through the 2D or 3D image data record of the images in advantageous configurations of the invention. In this case, the image values in some configurations may be determined by interpolating the respective adjacent pixels. It is also possible to adopt the image values of the pixels closest to the position time section instead.

In the position-time representation, the image values of the position time section of each image of the time series are then presented in succession; typically, in this case, one axis (e.g. y-axis) is the space axis and the other axis (e.g. x-axis) is the time axis. This type of presentation is similar to M-mode ultrasound images, with the exception that the position time section may assume any orientation through the 2D or 3D images and it is not restricted to the possible direction of the transducer or the ultrasonic waves.

This position-time representation is combined with a representation of the dynamic model as at least one computer graphical object. By way of example, a computer graphical object is a line, a group of points or other graphical elements which mark the position of the dynamic model on the respective position time sections.

This position-time representation permits a comparison of the computer graphical object or objects with the surrounding image content, i.e. with the (optionally interpolated) image values of the position time section, in particular by a user. As a result of this comparison, it is possible to ascertain the accuracy of the dynamic model, not only in a single image of a time series but also immediately in all images of the time series.

Further, an option is provided for correcting the dynamic model by editing the at least one computer graphical object, in particular by a user. In advantageous configurations, the user has the option of e.g. displacing or bending the computer graphical object or of adapting the position of individual points, etc. In some embodiments, the computer graphical object is a line and the user can set an indentation in the line by displacing a point in the line, with the indentation preferably being automatically rounded. In some embodiments, the line or the edited line corresponds to a spline function. By way of example, a point is displaced in accordance with the editing and the remaining points are "dragged along" in accordance with a spline function. As an alternative to a spline function, it is also possible to use other movement models or functions that are adapted to the expected movement pattern of the moving structure in order to facilitate an interpolation of the time profile, i.e. of the movement pattern that is visible in the position-time representation, which is as "smooth" as possible. By way of example, if the time series is a video sequence of a thrown ball, use could be made of an adequate kinematic model instead of a spline interpolation.

Preferably, the correction is undertaken by a user; however, an automatic correction is also conceivable, with the comparison between image content and computer graphical object being carried out automatically by a computer, for example with the aid of self-learning algorithms.

If the computer graphical object is edited appropriately, this change is transferred to the dynamic model, and so the latter is also modified accordingly. Suitable techniques for this step are known e.g. in the area of 3D computer graphics under "digital sculpting". Digital sculpting is the use of software that offers tools to push, pull, smooth, grab, pinch or otherwise manipulate a digital object as if it were made of a real-life substance such as clay. Thus, the computer graphical object may be manipulated slightly, by e.g. grabbing and pulling one point along a translation vector. This translation vector is transferred to the corresponding position and time point on the dynamic model, and the dynamic model is manipulated accordingly, by moving the point at that position and point in time along the translation vector, and entraining the neighbouring points on the model (neighbouring in terms of time and/or space) e.g. with a soft interpolation, as if the model were of rubber or clay.

In advantageous embodiments, the dynamic model is created, in particular, by tracking a planar structure, for example the inner surface or outer surface of a ventricle (endocardium or epicardium) of the heart, and so the dynamic model, at least in part, describes a moving model surface. By way of example, the dynamic model can represent the inner surface of a contracting ventricle (Beutel®-model).

In this case, the at least one computer graphical object is preferably a line which corresponds to a point of intersection of the position time section with the model surface or the projection thereof onto the position time section, plotted over time. In this case, the position time section intersects the model surface in at least some of the images.

In advantageous embodiments, it is not only one position time section that is set; instead, a plurality of said position time sections are set, for example at different points of a model surface, and then a plurality of position-time representations of the image values, combined with the representation of the dynamic model, are also performed—either successively or at the same time. Further, it is possible to provide a plurality of dynamic models which track different moving structures that are imaged in the images, for example the endocardium and the epicardium. In this way, it is also possible to combine a plurality of computer graphical objects with the position-time representation.

By way of example, a combined representation means that the computer graphical object is overlaid on the image values of the position time section, or a corresponding contrast between the computer graphical object and the surrounding image content (i.e. the image values) is established in a different way. This may also be effectuated by way of a different color scheme.

According to an advantageous configuration, the dynamic model is represented by a straight line on the position-time representation and the position of the image values of the position time section is appropriately adapted, in particular displaced, for each image of the time series. That is to say, expressed differently: the represented point of the dynamic model always remains at the same position in the position-time representation, the computer graphical object is therefore a straight line. Since the dynamic model is registered with the images, the corresponding image content, i.e. the respective position time lines or representations, is correspondingly displaced for each image in the time series. This is advantageous in that an error in the tracking method makes itself very clearly noticeable in the position-time representation since the image content is then "incorrectly" displaced and, for example, clearly identifiable by a discontinuity in the position-time representation.

This provides the user with an indication that the dynamic model must be urgently corrected at this point.

In advantageous configurations of the invention, the position time section has different positions, directions and/or lengths in the individual images of the time series. Here, it is advantageous if the position time section in the individual images of the time series is moved with the moving structure or with the dynamic model thereof. This is advantageous in that although the position time section does not show the same section in space (in an absolute coordinate system), it always shows approximately the same section of the moving structure. That is to say, the position time section follows the anatomy, for example the movement of the beating heart. This can be realized in various ways:

By way of example, it is possible to manually define a position time section both in the first image of the image sequence and in the last image of the image sequence and interpolate the position or alignment or length between these two end positions for the remaining images. Alternatively, the position time section can also be determined manually in a plurality of individual images of the image sequence. Here, it is advantageous if the user is provided with input elements by way of a user interface, for example a slider or knobs (on a screen or physical sliders) or swipe functionalities of a touchscreen, by means of which said user can manually adapt the position, orientation and length of the position time section, either for the entire image sequence and/or for individual images in each case. It is expedient if there is an automatic interpolation of the position, orientation and/or length of the position time section between the various images in which the user has determined the position time section for the images lying therebetween in time.

Entraining the position time section with the moving structure can also be effectuated by way of the tracked, dynamic model: in this case, the position time section remains securely anchored throughout the entire image sequence at the point at which it intersects the dynamic model, or passes the latter; i.e., it is effectively entrained by the dynamic model. Should there be a plurality of points of intersection with the dynamic model or models, the position time section can be anchored with both points of intersection and, as a result thereof, it can be entrained both in terms of its position and also in terms of its alignment and/or length. Thus, in advantageous embodiments, the position time section is entrained with the moving structure or with the dynamic model thereof by translation and/or rotation and/or deformation and/or change in length.

Entraining is advantageous in that the position-time representation looks very homogeneous, for example exhibits a steady pattern of stripes extending in the time direction—if the tracked dynamic model images the target structure well. If errors arise during the tracking and the dynamic model does not fit the structure, the stripe pattern of the position-time representation is unsteady and/or has discontinuities, which clearly indicate the need for a correction.

In advantageous configurations, the structure is an anatomical structure, in particular the heart, and the dynamic model is a contour model of a ventricle.

In a particularly advantageous embodiment, use is made of two tracked models, wherein one model tracks the inner side of the myocardium (endocardium) and the other tracks the outer side (epicardium). As a result of this, it is also possible to represent and optionally correct the local wall thickening of the myocardium. In an advantageous embodiment, the length of the position time section in the images of the time series is adapted to the time-varying thickening of the chamber. Here, a thickening of the muscle is compensated by reduction in the spatial sampling rate along the position time section. The cardiac wall then appears consistently thick in the position-time representation if the modeled thickening corresponds to the actual thickening that occurs in the image signal. If use is now made of two dynamic models, with one tracking the inner side of the myocardium (endocardium) and the other tracking the outer side (epicardium), it is possible to recognize and correct deviations from the modeled thickening.

Any one-dimensional geometry is suitable for the position time section. By way of example, use could also be made of the grayscale values along a tracked line, for example a center line through the myocardium of the heart, for the position-time representation. Hence, model and position time section h would be identical. In turn, the representation would be characterized by purely horizontal structures. However, if the tangential movement component were erroneous, this would result in a local wave pattern which could be corrected as described above. The representation of the computer graphical object could then be selected at any point along the model. A correction would be reflected in the tangential deformation of the tracked line. Alternatively, a plurality of lines could just as well be superimposed simultaneously.

The invention is also directed to a computer program containing software code sections which prompt a computer to carry out the method according to the invention when the computer program is executed on the computer. This computer program both is downloadable via the Internet and can be stored on a data medium, for example a CD-ROM, a USB stick, a hard disk drive, a memory card, etc.

The method can be executed on any normal computer that is configured to this end, in particular a server-client system, a PC, a workstation, in the cloud, or else a mobile device such as a notebook, laptop, tablet computer, smartphone, or on other electronic devices which have a screen and an input option.

The invention is also directed to an apparatus for correcting dynamic models of moving structures that are captured in images, said dynamic models being obtained by tracking methods and said apparatus being configured to carry out the method according to the invention. Such an apparatus comprises a data memory and one or more calculation units such as a CPU or other computer chip. Moreover, a screen or other display device is present and, optionally, an input apparatus which allows the user to edit the computer graphical object in the position-time representation. The input apparatus can be a touchscreen, a mouse, a keyboard or the like.

The invention is now explained in more detail on the basis of exemplary embodiments, with reference being made to the attached drawings. In the drawings.

Figure 1:
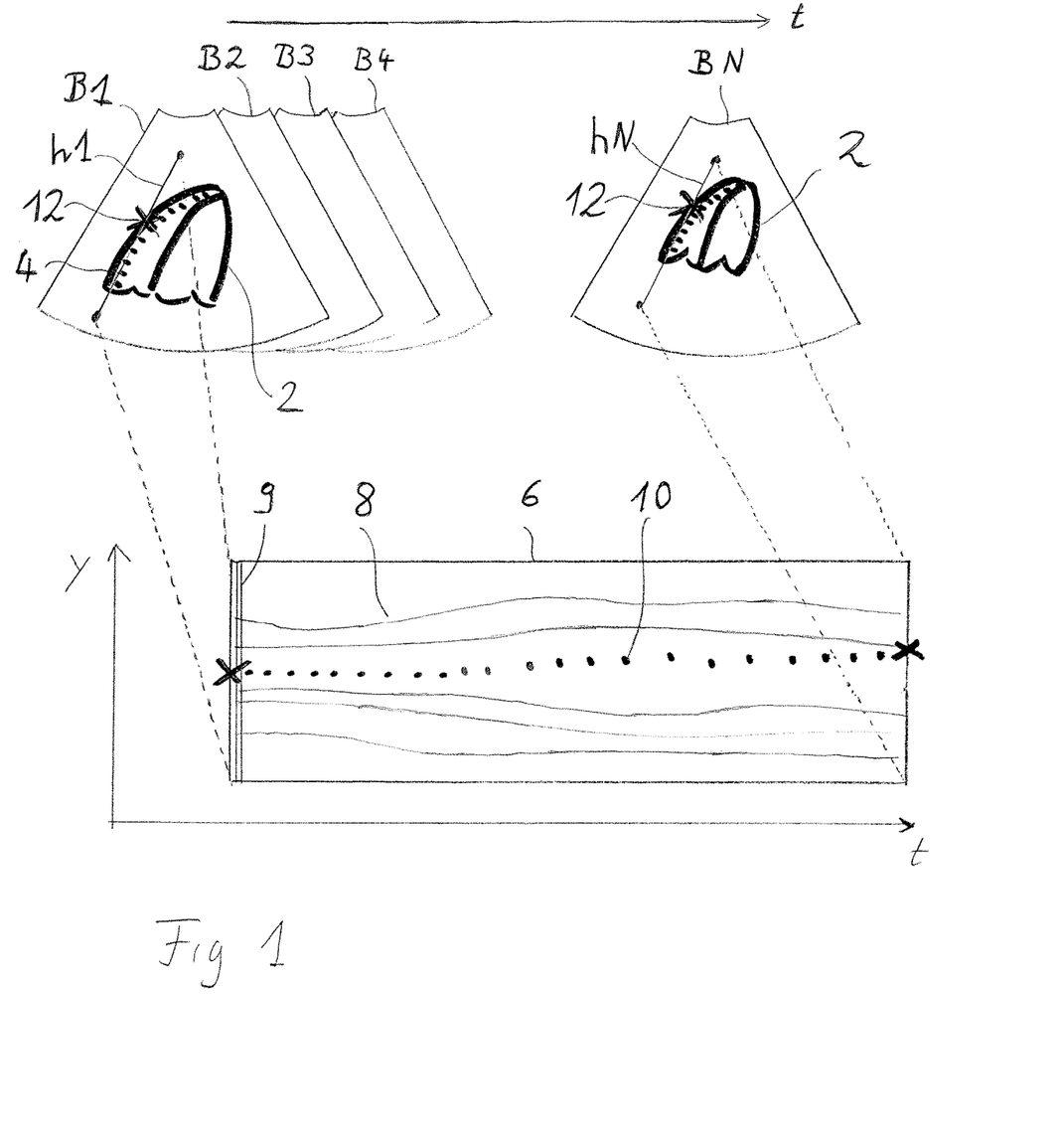
FIG. 1 shows a schematic overview of the method according to the invention.

FIG. 1 schematically shows the ultrasound images B1, B2, B3, B4, . . . , BN that are recorded along the timeline t, in which the beating heart can be seen as a moving structure in the apical four chamber view. This time series of ultrasound images could be acquired, for example, using a transthoracic ultrasound. The heart 2 has a left ventricle 20 and a right ventricle 22 (see FIG. 2).

The tracked dynamic model is plotted in these images schematically by dots and provided with a reference sign 4. Further, a position time section h—a straight line in this case—can be seen in the first image B1 and in the last image BN of the time series, said position time section being plotted, for example, by a user in these two images. This line h1 and hN, respectively, intersects the model 4 at the point 12.

The position-time representation is shown schematically in the lower part of the image. Here, the image values of the position time section h from each of the images of the time series are imaged next to one another, i.e. lines 9 which each show the image content at different times but from the same spatial section h (or h1, h2, h3, . . . , hN) are strung together. The point of intersection of the position time line h with the dynamic model 4 is combined with, e.g. overlaid on, the image content in the position-time representation 6 as a computer graphical object 10, as a result of which a line-shaped computer graphical object 10 arises (depicted by dots). The remaining image content 8 is not constant over time but instead yields a characteristic, uniform stripe pattern. A position-time representation 6 is virtually like an M-mode ultrasound, but was produced from a sequence of 2D or 3D ultrasound images and not recorded in the M-mode.

Figure 2:
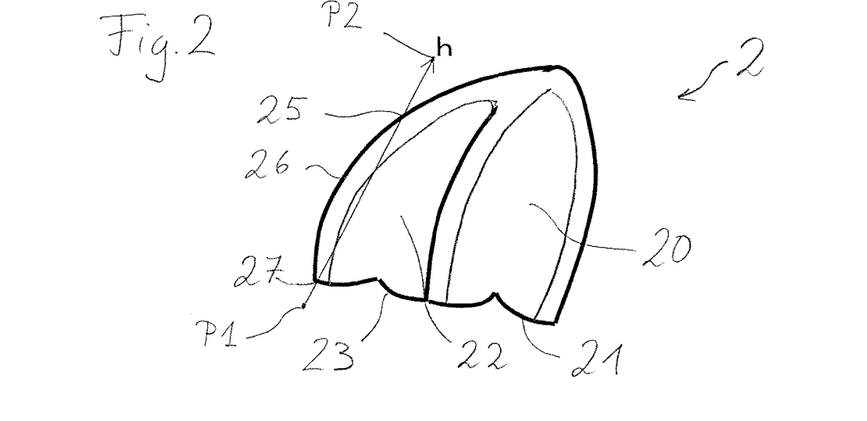
FIG. 2 shows a schematic ultrasound image of a human heart in the apical four-chamber view.

FIG. 2 shows a schematic ultrasound image of the heart with slightly more accuracy, including the exact position of the location-time section h, which is presented here as a vector h extending from the point P1 to the point P2 and intersecting with the epicardium 26 of the heart at points 25 and 27. Further, the left ventricle 20 and the bicuspid valve 21 can be seen in the representation of the heart, with the right ventricle 22 and the tricuspid valve 23 next to these. As a consequence, the position time section h has been set in such a way that a TAPSE (TAPSE=tricuspid annular plane systolic excursion) analysis is possible. TAPSE is an echocardiographic means for estimating the right ventricular function. It corresponds to the distance of the movement of the tricuspid annulus from end diastole to end systole.

Figure 3:
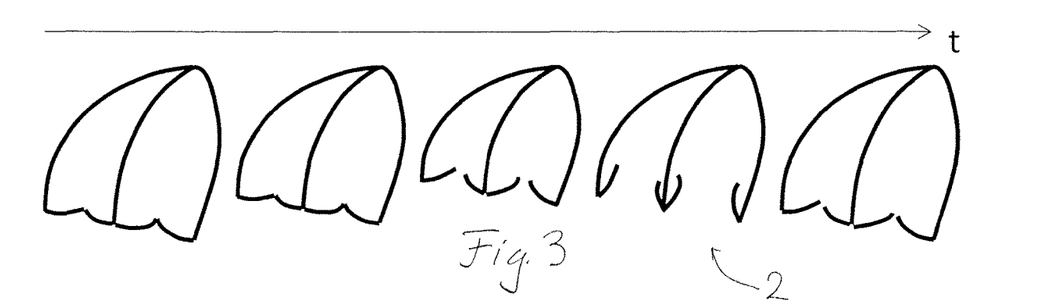
FIG. 3 shows a schematic illustration of the dynamic image content in the case of transthoracic echocardiography.

For the purposes of elucidating this movement, FIG. 3 shows the four-chamber view of FIG. 2 through a cardiac cycle, with the changing size of the ventricles 20 and 22 and of the opening and closing of the valves 21, 23 becoming visible.

Figure 4:
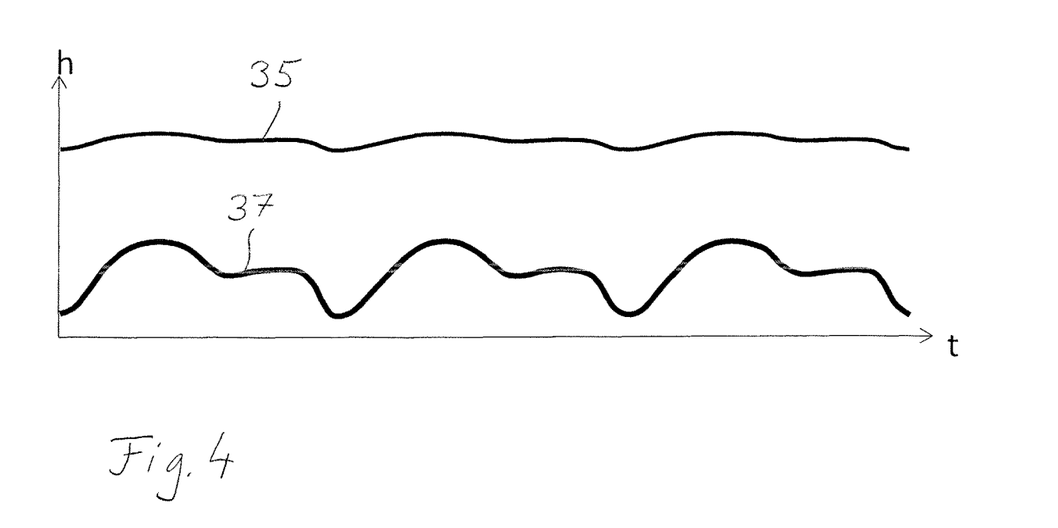
FIG. 4 shows a schematic position-time representation along the position time line h in FIG. 2.

FIG. 4 shows the resulting temporal profile of the image content along the position time line h of FIG. 2 in a position-time representation. The upper point of intersection of the position time line h with the epicardium 25 is represented here by the line 35, with the lower point of intersection 27 being represented by the line 37. The amplitude of the signal profile of line 37 can be used within the scope of a TAPSE analysis for estimating the right ventricular function.

There are a number of options for placing the position time section as illustrated in FIG. 2: by way of example, the user can select which one of the images of the image sequence they would like to have displayed, or the first image is automatically output on a screen. Then, a position time section can already be proposed automatically on the basis of landmarks in this image. In other embodiments, the user plots a position time line with appropriate input means. If the position time line is a straight line, as is the case in many embodiments, it suffices, for example, only to set the start point and end point P1, P2. In other exemplary embodiments, the user selects e.g. two landmarks, for example the points 25 and 27 in FIG. 2, and the computer automatically places a line therethrough, the length of which is set automatically.

FIG. 5 once again schematically shows the four-chamber view of FIG. 2, with the dynamic model 4 now additionally being plotted using dots. Here, this is a tracked contour or surface model of the right ventricle.

Figure 5:
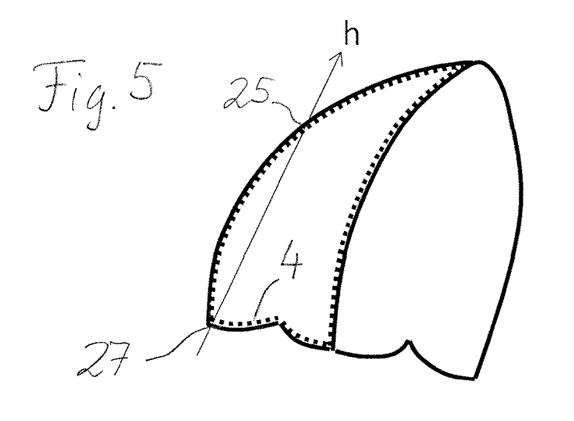
FIG. 5 shows a schematic illustration as in FIG. 2, with a tracked surface model of the right ventricle (depicted by dots)
Figure 6:
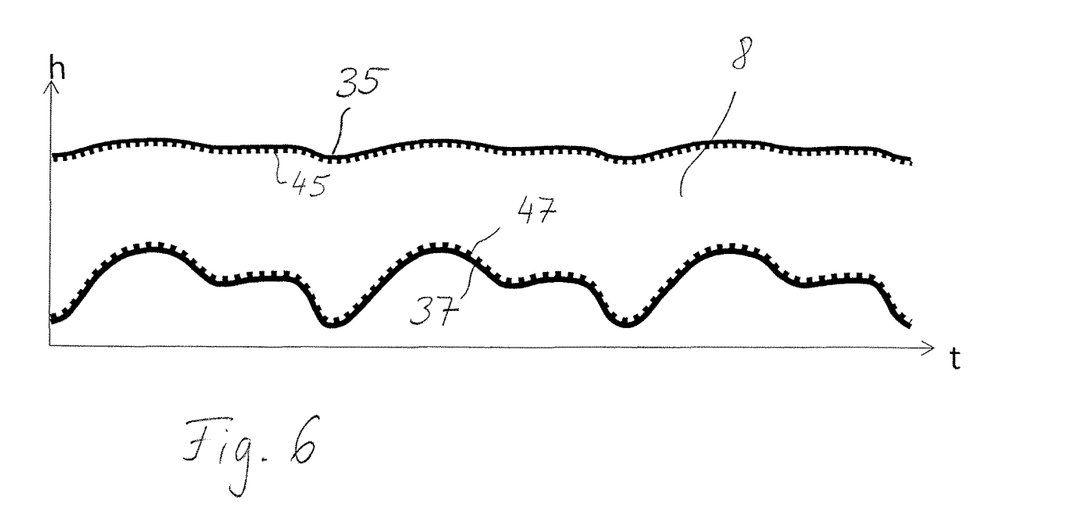
FIG. 6 shows a position-time representation along the position time line h in FIG. 5.

In the associated position-time representation that is depicted in FIG. 6, the image content 8, i.e. a scan of the image values or the amplitude signal along the vector h in all images of the image series (of which one is depicted in FIG. 5), is now depicted. This is overlaid with the corresponding point of intersection 25, 27 with the model 4, represented by dotted lines 45 and 47. In the example of FIG. 6, the anatomical structures, i.e. the image content 8, which is represented by the lines 35 and 37, has a good correspondence with the dynamic model 4 or with the computer graphical objects 45, 47 that represent the point of intersection 25, 27; a correction is not necessary.

Figure 7:
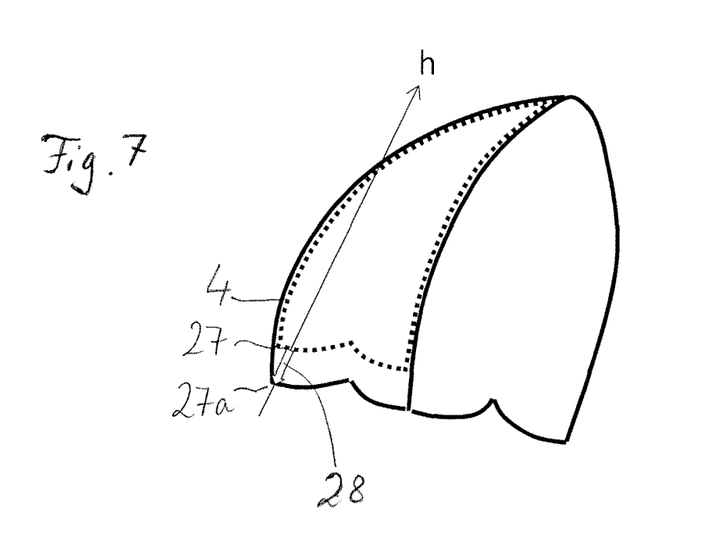
FIG. 7 shows a schematic illustration of an ultrasound image of the human heart in the four chamber view as in FIG. 5, in which the tracked model (depicted by dots) deviates from the actual course of the ventricle.
Figure 8:
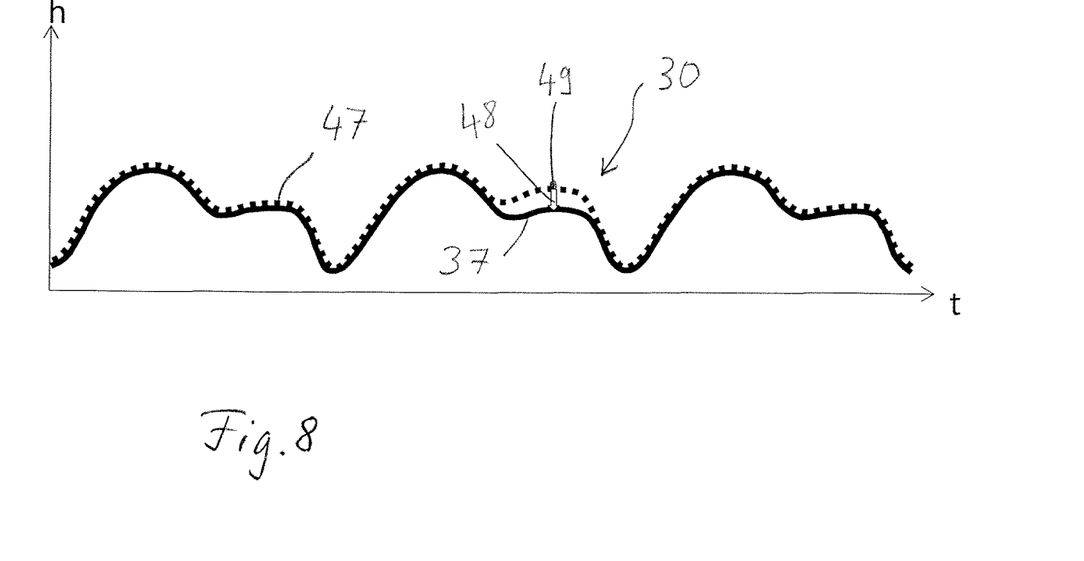
FIG. 8 shows a position-time representation along the position time line h in FIG. 7.

FIGS. 7 and 8 present the case where the dynamic model 4 does not have a good correspondence with the image content in at least one image, which is depicted in FIG. 7. Expressed differently, image content and tracked model do not move synchronously with one another. In this case, the lower point of intersection 27 of the position time line h with the dynamic model 4 clearly does not correspond to the tricuspid annulus, which is denoted by 27a. Instead, the model 4 would have to be extended downward in this image along the arrow 28; see FIG. 7.

From the position-time representation in FIG. 8, it is easily possible to identify that image content and tracked model do not move synchronously at location 30. It is also easy to identify the size of the relative deviations over time since the computer graphical object 47, which corresponds to the point of intersection 27, clearly does not run along the image content corresponding thereto at the location 30, i.e. the tricuspid annulus, the time profile of which is denoted by 37.

The basic concept of the invention now lies in making the representation of the tracked dynamic model 47 editable for the user. The changes are then correspondingly transferred to the model 4. As a consequence, the point of intersection of the dynamic model 4 can be modified in the direction of the vector h over time. In this way, corrections can be undertaken in any direction by suitable selection of the position time section h, i.e. the position, orientation and length thereof.

In the example of FIG. 8, the user can select the computer graphical object 47 e.g. at point 49, for example by means of the mouse or a different input means, and displace said computer graphical object downward along the arrow 48. Advantageously, only displacing the one point 49 by the user suffices, and so said user need not individually displace numerous points of the computer graphical object 47. By way of example, the dynamic model 4 and consequently also the computer graphical object 47 corresponds to a spline function with a plurality of nodes, or any other suitable movement model. If one node 49 is displaced, the entire surrounding line of the computer graphical object 47 is displaced accordingly such that, ideally, the computer graphical object 47 can be brought into correspondence with the actual movement of the tricuspid annulus 37 at the location 30 by way of a single mouse action.

Figure 9:
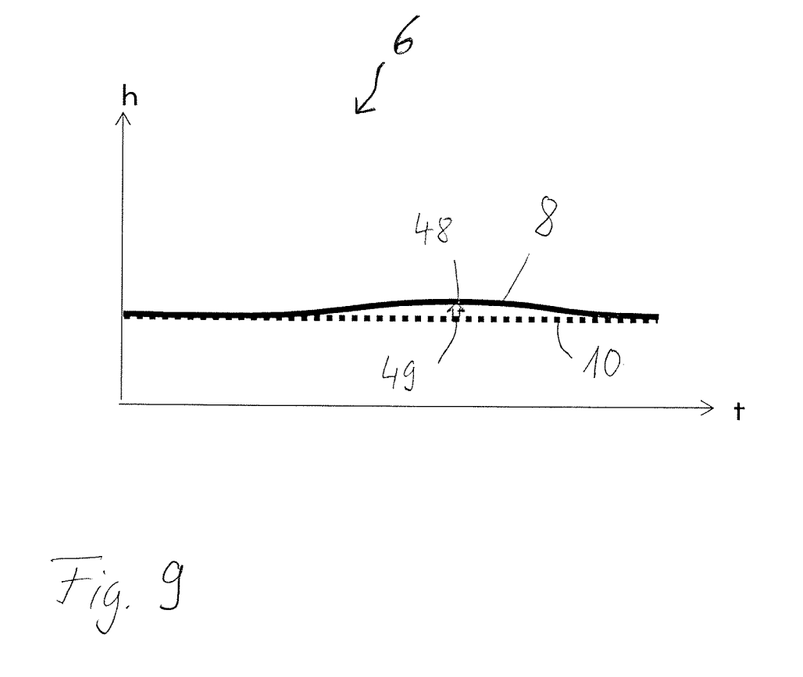
FIG. 9 shows a schematic position-time representation with a computer graphical object (depicted by dots) and a corrected computer graphical object (depicted by full line)

The correction is once again simplified if, in accordance with a preferred embodiment, the computer graphical object, which is once again denoted by the reference sign 10 in FIG. 9, is defined to be a straight line, as depicted in FIG. 9. The computer graphical object 10 nevertheless corresponds to a dynamic model 4, which does not move along a straight line. However, in the position-time representation 6, preferably all points of intersection (or corresponding points) of the position time section h with the dynamic model 4 are moved to the same level and the remaining image content 8 is accordingly displaced or—if points of intersection with a plurality of models 4 are present, the distance therebetween changing over time—even compressed or expanded. The object is to obtain a profile of the image content 8 that is as straight as possible, in that deviations from the horizontal profile of the computer graphical object 10 are conspicuous. Such a case is shown in FIG. 9, where the structure 8 corresponding to the dynamic model 4 has clearly not been selected accurately over time and instead deviates upwardly. According to the invention, there is the option of displacing the point 49—by a user or else automatically or semiautomatically—upwardly along the arrow 48 in the direction of the line 8, as a result of which the computer graphical object 10 is edited. The change in the computer graphical object 10 is transferred in turn to the dynamic model 4 and corrects the latter as a result thereof. Independently of the respective individual movement trajectory of the model 4, a standardized representation is always obtained thus, said representation only showing horizontally extending image structures in the error-free case. As a result, deviations from the ideal form can be recognized and corrected more easily—either visually or automatically.

Figure 10:
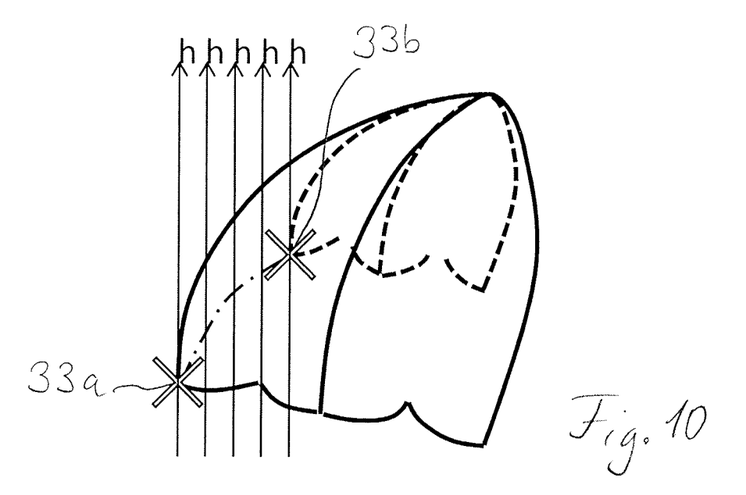
FIG. 10 shows a schematic illustration of an ultrasound image of the heart in the four-chamber view, which shows a parallel-displaced entrainment of the position time line h.

So that a point of intersection of the position time section h with the dynamic model 4 always exists, provision is made in some embodiments for changing the position of the position time section over the image sequence and, as a result thereof, adapting it to the movement of the dynamic structure or entraining it to said movement. An example of this is depicted in FIG. 10: the ventricles are represented by solid lines in the case of complete relaxation (end diastole) and, by contrast, with dotted lines in the contracted state (end systole). The outer point of the tricuspid annulus in the diastole and systole is respectively represented by 33a and 33b. As can be seen from FIG. 10, this point is displaced significantly during the heartbeat. In order to entrain the position time line h with the moving structure (the heart 2) or with the dynamic model 4 produced by tracking, it is advantageous in this case to e.g. displace said line in parallel.

In practice, this can be carried out in such a way that the position time line is "anchored" to the dynamic model 4 (not plotted in FIG. 10) at the point of intersection 33a in a first image, i.e. one of the points, or nodes, of the model 4 is marked as a point of intersection with the position time line h. Since, of course, the points of the dynamic model are tracked over the image sequence, the position of this point is known in each further image of the time series. Then, the position time section can e.g. be displaced in parallel on the successive images of the time series, in accordance with the movement of the marked point of the dynamic model, with the orientation being maintained; this results in the parallel displacement of FIG. 10. The length of the vector h can either be maintained or likewise be adapted to the movement, which will still be explained in more detail with reference to FIG. 14.

In the example of FIG. 10, the length of the position time line h remains unchanged; only the movement direction perpendicular to the vector h is transferred to the start point and end point of the position time line h.

Figure 11:
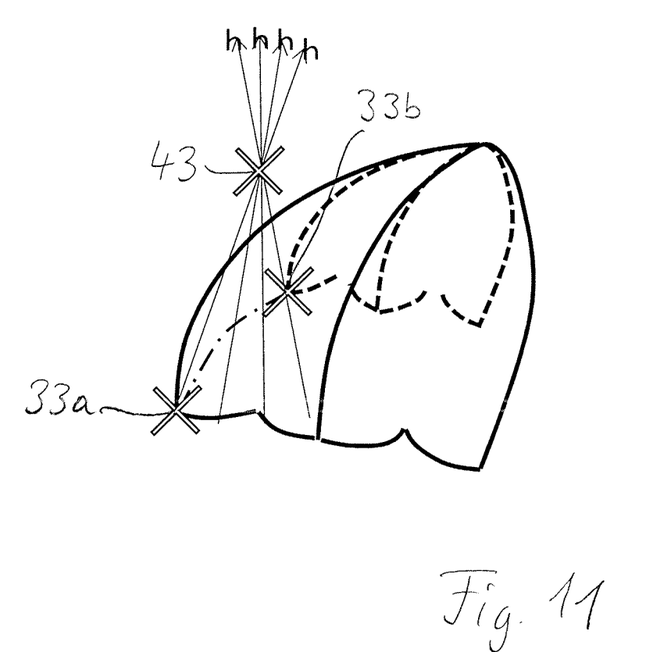
FIG. 11 shows a schematic representation of the heart in the four-chamber view which demonstrates an entrainment of the position time line h by swiveling.

FIG. 11 shows another case, in which the position time line h is entrained in a different way: here too, it remains anchored at a point 33a, 33b of the dynamic model 4 in each case. However, the alignment is not maintained but, instead, a fixed point 43 is set, with the position time line h of each image of the image sequence extending therethrough. The position time lines h always intersect the point 43 at the same relative length and are additionally rotated in each case in such a way that they also extend through the point 33. As a result, there is a swiveling of the position time line h from image to image.

The vectors denoted by h in FIGS. 10 and 11 in each case correspond to a position time section, the position of which only changes over the image sequence. In addition thereto, it is also possible to select a plurality of position time sections and evaluate the corresponding position-time representations either in succession or else at the same time.

Figure 12:
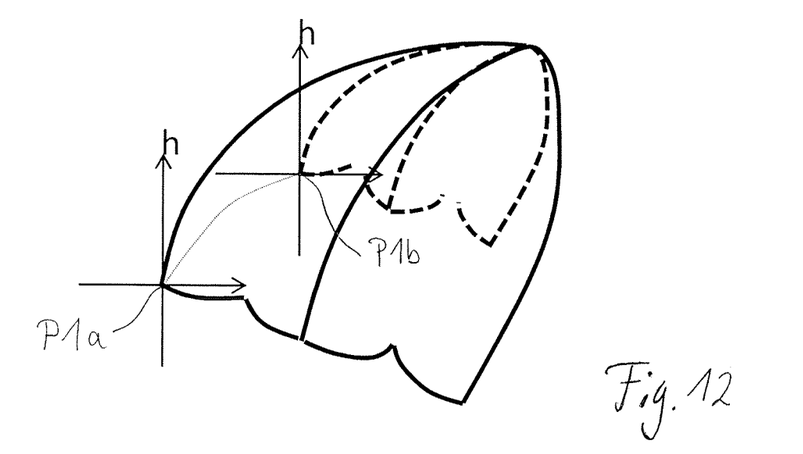
FIG. 12 shows a schematic illustration of the heart in the four-chamber view, which demonstrates an entrainment of the position time line h by complete translation.

FIG. 12 shows an example in which the position time section h is entrained with a complete translation, i.e. the vector h is not displaced in parallel but in both spatial directions (or in all three spatial directions in the case of 3D images). An example of this is shown in FIG. 12, in which the start point of the vector h, which is initially anchored to the tricuspid annulus, is entrained from image to image in such a way that it always remains at this anatomical position. At the end of the time sequence, or at the time at which the heart is contracted, the start point of the vector is situated at the point P1b. In this example, the length has not been adapted, although this is also possible; see FIG. 14.

Figure 13:
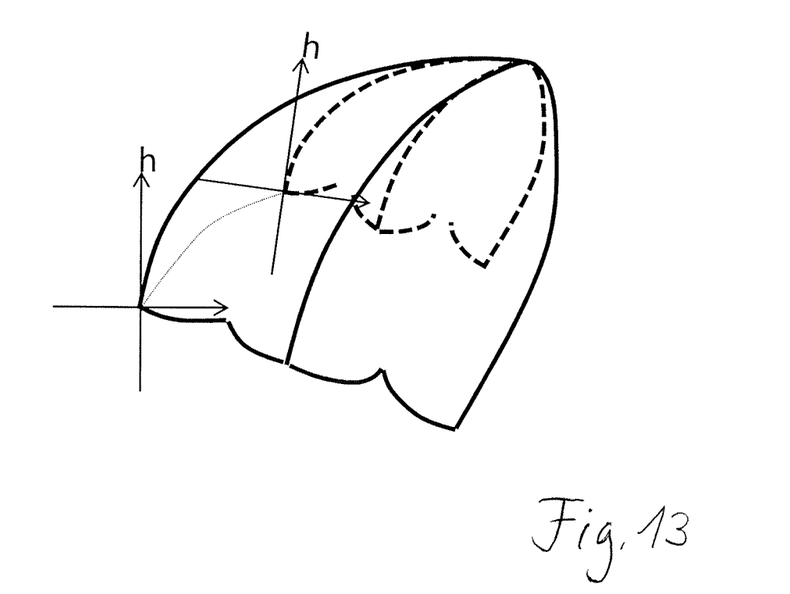
FIG. 13 shows a schematic illustration of the heart in the four-chamber view which demonstrates an entrainment of the position time line h by translation and (rigid) rotation.

FIG. 13 shows the case in which the position time line h is entrained by translation and an additional rotation; here, the line h remains rigid in the shown example. However, there may additionally also be a deformation, as described below.

Figure 14:
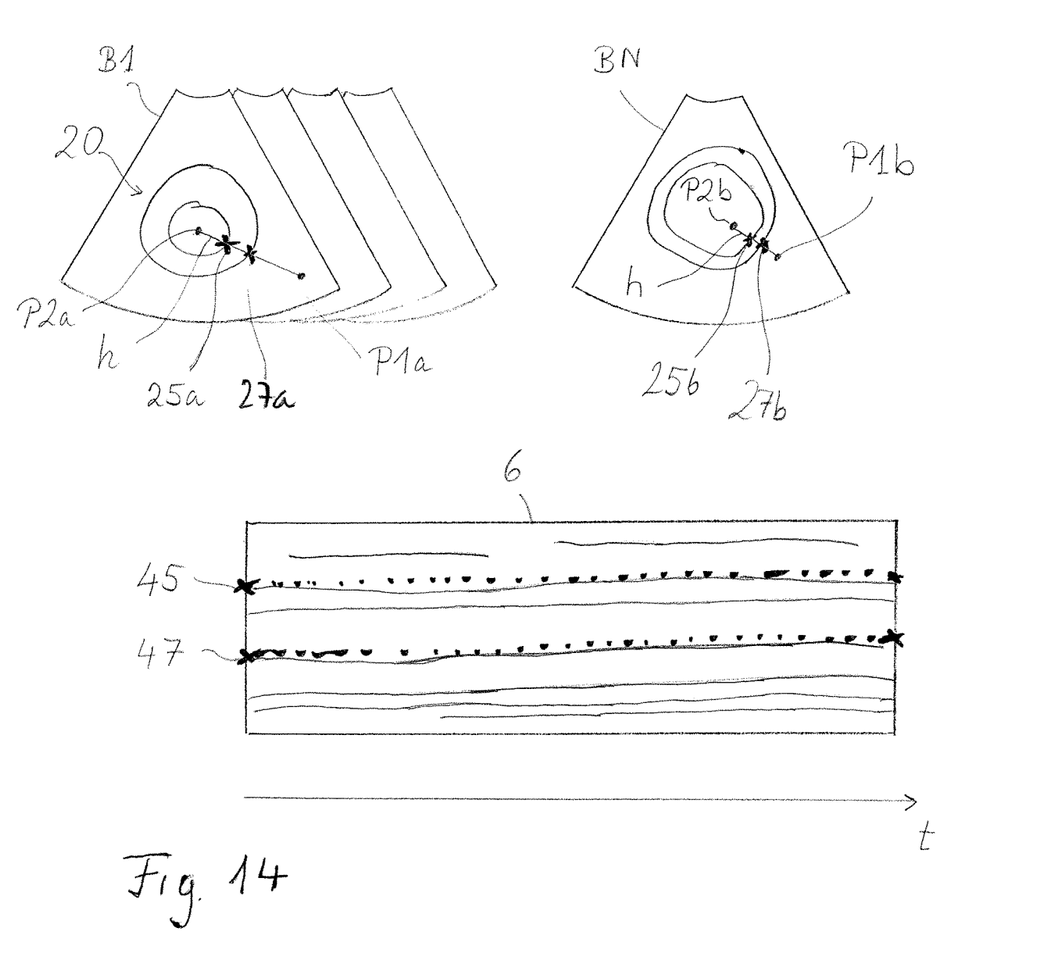
FIG. 14 shows a schematic illustration of ultrasound images and a corresponding position-time representation for correcting the thickening of the wall of the ventricle.

FIG. 14 shows an image sequence B1, . . . , BN again, with the two-dimensional ultrasound images this time representing a cross section of a left ventricle 20. The object of the examination is to track the dynamic thickening of the ventricle wall and, as a result thereof, diagnose possible muscle damage. As a consequence, the position time line h is placed in such a way that it intersects the chamber wall approximately perpendicularly and—in the first image B1—extends from a point outside of the ventricle P1a into approximately the center of the chamber P2a. It is also possible to define further position time lines at further points of the ventricle wall.

In this example, it is advantageous to simultaneously use a plurality of tracked dynamic models, to be precise two dynamic models in particular, with one tracking the inner side of the myocardium (endocardium) and the other tracking the outer side (epicardium). This renders it possible to represent, and optionally correct, the local wall thickening of the myocardium. The respective points of intersection of the position time line h with the two surface models are denoted by 25a and 27a in the first image B1 and by 25b and 27b in the last image BN. These points of intersection are transferred into, or overlaid on, the position-time representation 6 as lines 45 and 47 (which are plotted with dots). Advantageously, these points of intersection 45, 47 are represented by straight lines and the position of the position time lines 9 in the position-time representation 6 is accordingly adapted or displaced where necessary (in the case of complete entrainment of the position time vector h, as described below, this emerges automatically, and so a further displacement of the position time lines 9 is unnecessary).

Advantageously, the position time vector h is entrained by translation, rotation and an additional deformation in this example, as is rendered clear by the comparison between B1 and BN: in the image BN, the heart is relaxed and the muscle or the cardiac wall is therefore thinner. This is compensated by an increase in the spatial sampling rate along the vector h. This is triggered by virtue of the points of intersection 25b and 27b of the position time line h with the tracked models of the endocardium and epicardium moving closer together. As a result, the endpoints of the position time line h, P1b and P2b, are also proportionally moved closer to one another; the entire position time line is shortened. Advantageously, this is compensated by an increase in the spatial scanning rate. As a consequence, the local deformation (e.g. thickening of the cardiac wall) is modeled. The cardiac wall then appears with an unchanging thickness in the position-time representation 6 if the tracked models 45, 47, and hence the modeled thickening, correspond to the actual thickening occurring in the image signal. As a consequence, it is possible to identify and correct deviations of the modeled thickening.

Expressed differently: if the coordinate system for the vector h is completely entrained with the surface model (complete translation, rigid body transformation (translation plus rotation) and additionally a deformation as well), the trajectory of the model in the position-time representation becomes a horizontal straight line. In the case of exact tracking, the amplitude signals of the scanned image content are parallel thereto. Deviations become noticeable accordingly by a curved temporal signal profile.

Figure 15:
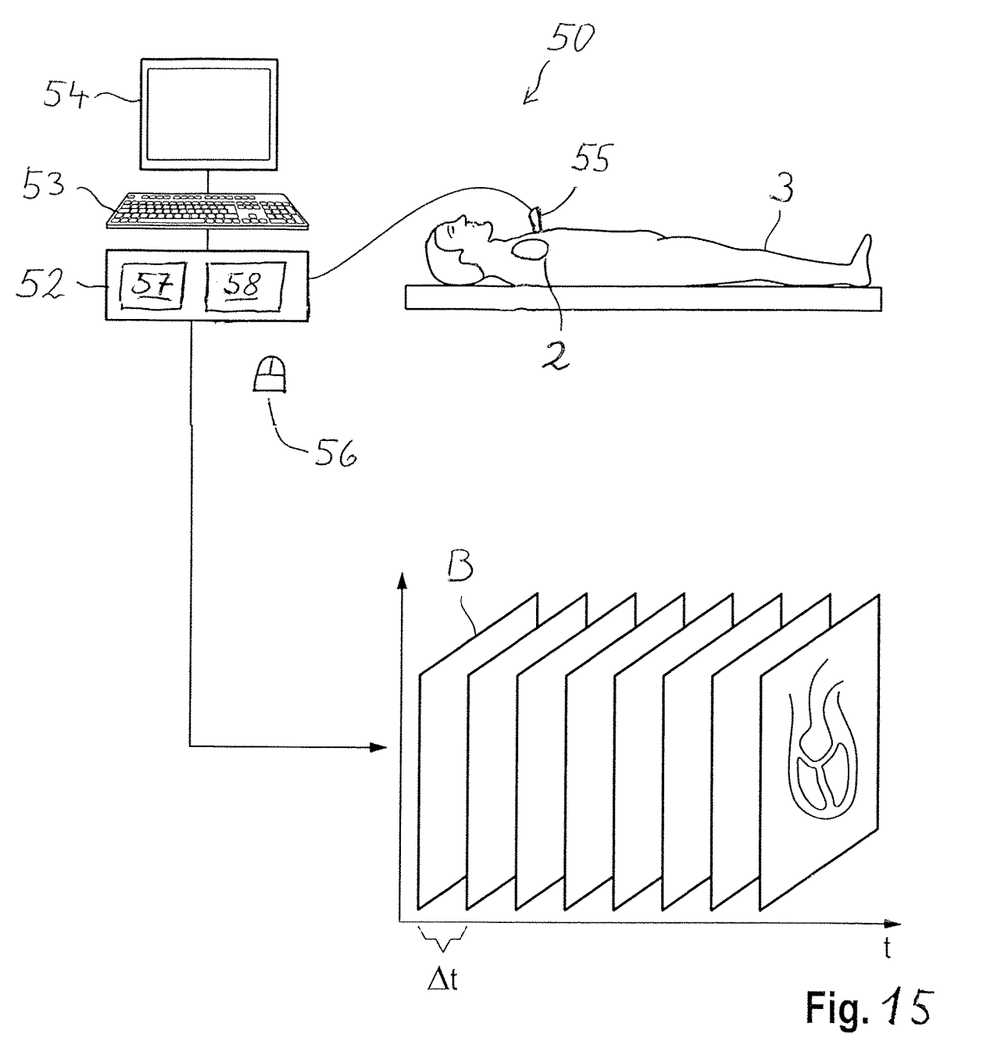
FIG. 15 shows a schematic illustration of an apparatus according to the invention.

FIG. 15 shows an apparatus 50, by means of which the method can be carried out. Said apparatus essentially contains a computer 52, a PC with a memory unit 57, for example hard disk drive, and a computation unit 58 in the illustrated example. By way of example, the computation unit is a CPU. A monitor 54 and a keyboard 53 are connected to the computer 52. Further, a mouse 56 is provided as a further input device. However, this is merely an example; the invention can be carried out on any type of computer.

In the illustrated example of FIG. 15, the apparatus 50 simultaneously is also an ultrasound device, by means of which the image sequence can be acquired. To this end, a transthoracic ultrasound is carried out on the heart 2 of a patient 3, in which an ultrasound transducer is guided by appropriate specialist staff. As a consequence, a series of 2D or 3D images can be acquired, as illustrated in the lower part of the image. Here, 2D images B, which are respectively recorded at a temporal interval of Δt, are plotted, wherein the acquisition rate may be approximately 20 to 200 Hz, preferably 50 to 150 Hz.

The invention claimed is:

1. A method for identifying and correcting errors in dynamic models of moving structures captured in images, the dynamic models having been obtained by tracking methods, wherein the method comprises the following steps:

a) providing a time series of images recorded successively in time, the moving structure being imaged at least in part in the images;

b) providing a dynamic model of the moving structure, the dynamic model having been obtained by a tracking method applied to the images of the time series and wherein the dynamic model is registered with the images;

c) following step b, determining a position time section of the images, wherein the position time section comprises a one-dimensional section of the images that intersects the moving structure in at least one of the images;

d) providing a position-time representation of the position time section in the images of the time series by ploting, over time, image values of the position time section of each image of the time series, combined with a representation of the dynamic model as at least one computer graphical object;

e) comparing the computer graphical object with surrounding image content of the position-time representation, and f) providing an option for correcting the dynamic model by editing the at least one computer graphical object and for transferring any changes made to the computer graphical object to the dynamic model.

2. The method as claimed in claim 1, wherein the dynamic model at least in part describes a model surface and wherein the at least one computer graphical object is a line which corresponds to a point of intersection of the position time section with the model surface or a projection thereof on the position time section, plotted over time.

3. The method as claimed in claim 1, wherein the dynamic model is represented by a straight line in the position-time representation and the position of the image values of the position time section in the position-time representation is adapted for each image of the time series.

4. The method as claimed in claim 1, wherein the position time section has different positions, directions and lengths in the individual images of the time series.

5. The method as claimed in claim 1, wherein the position time section in the individual images of the time series is entrained with the moving structure or the dynamic model thereof by way of translation, rotation, deformation, change in length, or a combination thereof.

6. The method as claimed in claim 1, further comprising providing an option to the user to adapt the position, orientation, and length of the position time section.

7. The method as claimed in claim 1, wherein a plurality of dynamic models are provided.

8. The method as claimed in claim 1, wherein the moving structure is a heart, and the dynamic model is a surface model of a ventricle of the heart.

9. The method as claimed in claim 8, wherein a dynamic model of an endocardium of the heart and a dynamic model of an epicardium of the heart are provided, wherein the position time section intersects a wall of the ventricle, and wherein a length of the position time section in the images of the time series is adapted to a time-varying thickening of the wall of the ventricle.

10. The method as claimed in claim 1, wherein the position time section extends along a tracked line through a myocardium of a heart.

11. The method as claimed in claim 1, wherein the moving structure is a heart, wherein a first dynamic model is provided which represents one side of a myocardium of the heart, and a second dynamic model is provided which represents an opposite side of the myocardium, wherein the position time section is selected such both the first and second dynamic models are represented by a respective computer graphical object in one or more of the position time sections in the position-time representation.

12. The method as claimed in claim 11, wherein a length of the position time section is varied in one or more of the images in the time series such that a thickness of the myocardium wall appears substantially constant in the position-time representation.

13. A non-transitory computer readable medium comprising instructions which cause a computer to carry out the method steps as claimed in any one of the preceding claims when the instructions are executed on the computer.

14. An apparatus for identifying and correcting errors dynamic models of moving structures that are captured in images, said dynamic models having been obtained by tracking methods and said apparatus being configured to carry out the method as claimed in claim 1, wherein the apparatus comprises:

a data memory which stores at least one time series of images recorded successively in time, the moving structure being imaged at least in part in said images, and a dynamic model of the moving structure, which is obtained by a tracking method and registered with the images;

one or more calculation units which are configured to carry out the method as claimed in claim 1;

a screen configured to display the position-time representation; and an input apparatus which allows a user to edit the computer graphical object on the position-time representation.

* * * * *